(12) United States Patent
Izumo et al.

(10) Patent No.: US 9,121,749 B2
(45) Date of Patent: Sep. 1, 2015

(54) WEIGHING DEVICE HAVING A WEIGHING CHAMBER

(75) Inventors: Naoto Izumo, Saitama (JP); Hisanori Oda, Saitama (JP)

(73) Assignee: A&D COMPANY LIMITED, Tokyo (JP)

( * ) Notice: Subject to any disclaimer, the term of this patent is extended or adjusted under 35 U.S.C. 154(b) by 258 days.

(21) Appl. No.: 13/701,189

(22) PCT Filed: Jun. 14, 2011

(86) PCT No.: PCT/JP2011/003390
§ 371 (c)(1),
(2), (4) Date: Nov. 30, 2012

(87) PCT Pub. No.: WO2011/158497
PCT Pub. Date: Dec. 22, 2011

(65) Prior Publication Data
US 2013/0068542 A1   Mar. 21, 2013

(30) Foreign Application Priority Data
Jun. 17, 2010   (JP) .................................. 2010-138065

(51) Int. Cl.
*G01G 21/28* (2006.01)
*G01G 23/00* (2006.01)

(52) U.S. Cl.
CPC .............. *G01G 21/28* (2013.01); *G01G 21/286* (2013.01); *G01G 23/00* (2013.01)

(58) Field of Classification Search
CPC ...... G01G 21/28; G01G 21/286; G01G 23/00
USPC ............ 177/25.12, 25.13, 180, 181, 238, 244
See application file for complete search history.

(56) References Cited

U.S. PATENT DOCUMENTS

| 4,291,775 A * | 9/1981 | Collins ........................... 374/14 |
| 6,302,577 B1 * | 10/2001 | Jennings et al. ................. 374/14 |

(Continued)

FOREIGN PATENT DOCUMENTS

| CH | 678570 A5 * | 9/1991 | ............. G01G 21/28 |
| EP | 2060885 A1 | 11/2007 | |

(Continued)

OTHER PUBLICATIONS

English abstract of CH 678570 published Sep. 30, 1991.*
International Search Report of PCT/JP2011/003390 dated Jul. 12, 2011.

*Primary Examiner* — Peter Macchiarolo
*Assistant Examiner* — Natalie Huls
(74) *Attorney, Agent, or Firm* — Roberts Mlotkowski Safran & Cole P.C.

(57) ABSTRACT

A weighing device is provided that suppresses air convection currents generated in a weighing chamber in the opening/closing of a door of the chamber with a relatively simple configuration. A weighing space is partitioned into two spaces with a partition plate to form a lower small-capacity weighing chamber, which enables to settle down the convection in a short time if convection is generated in the chamber. Suspended walls adjacent to the doors are attached to the partition plate edge sides along the door opening/closing directions. Even when a door is opened, warm air stagnant in the upper space in the chamber is restricted or blocked to flow out to the outside by the suspended walls, which generates no convection or slight convection, which settles down in a short time, without adverse effect on a weighing operation. The upper space may be utilized for another purpose such as a neutralization chamber.

4 Claims, 2 Drawing Sheets

(56) References Cited

U.S. PATENT DOCUMENTS

| | | | |
|---|---|---|---|
| 6,557,391 B2* | 5/2003 | Luchinger | 73/1.13 |
| 6,566,614 B1* | 5/2003 | Fluckiger et al. | 177/180 |
| 6,603,081 B2* | 8/2003 | Luchinger | 177/126 |
| 6,965,083 B2* | 11/2005 | Reiser | 177/238 |
| 2010/0288660 A1* | 11/2010 | Luchinger et al. | 206/305 |
| 2013/0292192 A1* | 11/2013 | Jaia | 177/181 |

FOREIGN PATENT DOCUMENTS

| | | |
|---|---|---|
| JP | 62-184436 U | 11/1987 |
| JP | Hei 4-113029 | 10/1992 |
| JP | 07-324970 | 12/1995 |
| JP | 2822671 B2 | 11/1998 |
| JP | 2002-195873 A | 7/2002 |
| JP | 2010-190600 A | 9/2010 |

* cited by examiner

WEIGHING DEVICE HAVING A WEIGHING CHAMBER

TECHNICAL FIELD

The present invention relates to a weighing device, which has a weighing chamber, and is capable of minute mass measurement, and particularly, to a weighing device which is configured to prevent generation of air convection in the weighing chamber at the time of opening and closing of a door of the weighing chamber.

BACKGROUND ART

It has been known that vibration, wind pressure, temperature, humidity, static electricity, atmospheric pressure, magnetism, gravitational acceleration, and the like whose effects are mostly ignored in the case where relatively large mass is measured, have an effect on a measurement value as error factors (disturbances) causing measurement errors at the time of measurement of mass, particularly minute mass measurement. In particular, in a device which is capable of minute amount measurements, such as an electromagnetic equilibrium system weighing device (commonly called "analytical balance") which is capable of weighing 0.1 mg (a weight of approximately ¹⁄₁₀,₀₀₀ of a weight of a 1-yen coin) or less as a minimum indication, the above-described disturbances are unignorable gross error factors in measurement, and it is necessary to exclude the error factors in calculation of a measurement value by some means.

Here, with respect to the atmospheric pressure, temperature, humidity, and gravitational acceleration among the above-described error factors, changes therein are generated in accordance with motion of heavenly bodies and weather changes, and those changes are relatively gradual, and effects thereof on volume balance, weight balance, and the like are dominant. Therefore, the effects on the performance of the weighing device due to these changes appear as zero-point drifting over a long time. Accordingly, this problem can be solved by a zero-point operation before weighing except for cases of continuous measurement of a same sample for a long time.

On the other hand, for the error factors of vibration, static electricity, and magnetism, methods for actively eliminating or removing the factors have been established, such as providing a vibration removal, vibration isolation, or neutralization mechanism, distancing the source of magnetism, and carrying out magnetic shielding. In addition to eliminating the factors by physical means as such, a program for correcting measurements in response to disturbance factors has also been established.

In contrast to the foregoing error factors, wind pressure and air flow are sudden and often have an effect as an abrupt change in a weighing device capable of minute mass measurement, and thus a correction processing by a program for elimination of measurement errors is virtually impossible. Therefore, there have been proposed various windproof mechanisms for minimizing the effect of wind pressure and air flow on a weighing mechanism section for measuring the mass.

Air fluctuation as error factors in mass measurement, it ranges from a level at which it is possible for a person to sense the air as wind, up to air flow at a slight fluctuation level at which it is practically impossible to sense. Among those, in particular, air flow is unstable, and sustained for a long time in many cases as compared with wind pressure. However, it is possible to cope with air flow outside of a weighing device, for example, flow of heating and cooling air by an air conditioner, flow of discharge air from an air purification system, and the like by means of stopping these devices or distancing the weighing device from these devices, and the like to a certain extent.

On the other hand, in the weighing device itself as shown in FIG. 3A, air (hereinafter called "warm air") A1 warmed by this electronic substrate and the like rises up to the upper part of the weighing chamber in a weighing chamber 50 by heat generated from an internal electronic substrate and the like, and a stagnant layer A1' of the warm air A1 is formed sequentially from the upper part toward the lower part of the weighing chamber 50. Further, in this transient state, the air is cooled down by relatively low-temperature air around the weighing chamber, to generate downdraft. The temperature distribution of the air in the weighing chamber 50 is gradually uniformed due to an increase in capacity of the stagnant layer A1', and therefore, according to this, convection inside the weighing chamber is reduced.

In this way, even in a state in which air flow inside the weighing chamber is stable, which does not have an effect on a measurement value of a sample, relatively intense convection may be generated inside the weighing chamber as described below when the door of the weighing chamber is opened.

When a temperature of the weighing chamber 50 is raised compared to the outside of the device, even if its temperature difference is extremely slight, relatively large convection is generated when the weighing chamber is opened and closed. That is, in the case where a door 50A of the weighing chamber 50 of FIG. 3A is opened to place a sample on a weighing dish 51, even in a case where a temperature inside the weighing chamber 50 is slightly higher than the outside of the weighing chamber 50, as shown in FIG. 3B, the air in the stagnant layer A1' which has been stagnant in the upper part of the weighing chamber 50 flows out as air A2 along the outerwall of the weighing chamber 50, and air A3 flows into the weighing chamber 50 from the outside of the weighing chamber so as to correspond to the outflow of the air A2. As a result of this, imperceptible convection different from that when the weighing chamber 50 is hermetically closed is generated in the weighing chamber 50, which may lower the reliability of a weighed value of a sample, or may make measurement itself impossible.

Incidentally, it has been confirmed that a weighing error by this air flow (convection) reaches several tens of milligrams at a maximum. This value becomes several tens of dig in a weighing device of 0.1 mg as a minimum indication, which corresponds to 1,000 dig in a weighing device of 1 μg, that is a major cause of measurement error.

In addition, the illustrated case shows a state in the case where the door 50A on the right side toward the front of the weighing chamber 50 is opened. Meanwhile, another door 50B as well is generally formed at a position facing the door 50A in the weighing chamber 50, and in this case, the above-described situation is caused when the door 50B is opened, as a matter of course.

As described above, because it is extremely difficult to process by a program the effects of weighing errors caused in a short time by air fluctuation, in particular, air flow (convection), a variety of windproof mechanisms which physically reduce the effect of air flow on the weighing mechanisms are proposed centering on persons who provide devices for minute amount measurements such as an electronic balance. However, all mechanisms have both merits and demerits.

Patent documents in which windproof structures are proposed are shown below.

Patent Document 1: Japanese Published Unexamined Utility Model Application No. S62-184436
Patent Document 2: Japanese Patent No. 2822671

DISCLOSURE OF INVENTION

Problems to be Solved by the Invention

The inventions of the above-described patent documents are both configured to be a double weighing chamber structure by further forming a small-sized weighing chamber in a weighing chamber, and to perform weighing in this small-sized weighing chamber. That is, those are configured such that the weighing chamber is a double structure, and a weighing dish is disposed in this internal small-sized weighing chamber, so as to weigh a sample in this internal weighing chamber. The technologies described in these two patent documents are configured on the common premise of the knowledge that, given that a volume of a weighing chamber directly relating to weighing of a sample is formed into the lowest capacity possible, air convection or the like is resolved relatively quickly in a low capacity space.

The device of Patent Document 1 between the above-described patent documents is configured to achieve the above-described technical purpose by disposing a small-sized windproof device so as to cover the weighing dish in the weighing chamber. It is possible to provide this device relatively-inexpensively because of its simple configuration. However, because the installation and removal of the windproof device are manually performed, there is a possibility that air flow due to a body temperature of a human body in the installation and removal operations and convection due to a rise in temperature of weighing chamber component members will be generated.

On the other hand, the device of Patent Document 2 is configured to prevent generation of air flow according to manual opening and closing of the door as much as possible by further forming a small-sized weighing chamber inside the weighing chamber, and by automating opening and closing of the door of this small-sized weighing chamber. In this invention, it is expected to further reduce air flow as compared with the above-described device. On the negative side, it is recognized that the entire device is complicated and expensive from necessity of configuration of the automatic door opening and closing mechanism. Further, there is a possibility that means for removing heat, vibration, and the like generated by an energy-consuming actuator, such as a motor and the like composing these opening and closing mechanisms will be separately needed.

Further, both patent documents have a common technical purpose of settling air flow in a short time by making a space for performing weighing of a sample small, and in order to achieve this technical purpose, it is necessary to make the space for performing measurement of a sample into the lowest capacity possible. As a result, there is a common problem that a measurement of a sample and the operability in sample measurement are not favorable such as it is impossible to measure a long sample.

Means for Solving the Problems

The present invention has been achieved in consideration of the above-described problems in the conventional configuration.

That is, the present invention relates to a configuration of a weighing chamber in which suspended walls drooped along opening and closing directions so as to cover a part of the upper part of a door portion of the weighing chamber are configured, the weighing chamber is configured to prevent warm air stagnant in the upper part of the weighing chamber from flowing out at one burst to the outside of the weighing chamber at the time of opening the door, thereby preventing generation of convection inside the weighing chamber by the outflow of warm air as much as possible. That is, the device is configured such that the weighing chamber is partitioned up and down with a partition plate, to reduce a capacity of the weighing chamber to an extent that its operability is not impaired, and the suspended walls are attached to the end edges of this partition plate, to make the partitioned upper space part of the weighing chamber available for another purpose such as a neutralization chamber.

Advantageous Effect of the Invention

Due to the suspended walls formed in the upper space of the weighing chamber, even when the door of the weighing chamber is opened, the warm air stagnant in the upper space of the weighing chamber does not flow out at one burst in any case, and when the lower end of the warm air layer is above the lower end edges of the suspended walls, the layer of warm air hardly ever flows out. Therefore, generation of air convection in the weighing chamber by an outflow of warm air is suppressed as low as possible, which makes it possible to rapidly and accurately measure a sample.

Further, because the capacity of the space of the weighing chamber is reduced to an extent that its operability is not impaired by partitioning the inside of the weighing chamber up and down with a partition plate, even when convection is generated, it is possible to settle the convection early, and it is possible to utilize the upper space of the weighing chamber for another intended purpose such as a neutralization chamber.

Further, because the present invention can achieve the technical purpose by forming the suspended walls, its configuration is relatively simple, which makes it possible to provide the device inexpensively, and it is also possible to achieve the object of the present invention by attaching suspended walls afterward to the weighing chamber of an electronic scale already in use.

First Embodiment

Hereinafter, an embodiment of the present invention will be described in detail with reference to the drawings.

In FIG. 1, an arrow 1 shows an electromagnetic equilibrium system electronic balance as one type of electronic scale, that is an object of implementation of the present invention. A basic configuration of this electronic balance is a configuration in which a weighing space 5 in which a weighing dish 2 is disposed is formed in the front part of the device, and a mechanism chamber 3 in which a load transfer mechanism and an electronic circuit are disposed is formed in the rear part of the weighing space 5.

Reference numeral 4 is a partition plate. This partition plate 4 is disposed so as to partition the space formed as the weighing space 5 in the basic configuration of this electronic balance up and down, and the space is formed into partitions of an upper space 6 and a space for weighing chamber (hereinafter simply called "weighing chamber") 7 formed under the space 6 by this partition plate 4. In addition, as the partition plate 4, any material may be used only for the purpose of partitioning the weighing space 5 formed in advance. However, in the case where the upper space 6 is used for a specific purpose as will be described later, it is necessary to form the partition plate 4 from a material suitable for the purpose of use. For example, in the case where the upper space 6 is utilized as a neutralization chamber, a plate-like member to which conductive property is added, for example, transparent glass or the like is favorable for the partition plate 4.

The partition plate 4 may be fixedly disposed in the weighing space 5. However, considering convenience of maintenance, and that the required weighing accuracy as well is reduced in many cases when a large tare sample such as a sample put in a flask is measured, the partition plate 4 is preferably configured to be removable. Reference numerals 8a and 8b are supporting members for attaching the partition plate 4, and members bridged between the rear wall of the weighing space 5 and the front wall of the weighing space (which is normally formed of a glass plate through which it is possible to visually check the interior of the weighing chamber), and the partition plate 4 is disposed so as to be slid into the supporting members 8a and 8b, to partition the weighing space 5 into the upper space 6 and the weighing chamber 7.

In the illustrated configuration, these supporting members 8a and 8b are respectively fixedly disposed at a substantially intermediate height of the weighing space 5, and adjacently sliding doors (hereinafter simply called "doors") 10a and 10b for opening and closing the weighing space 5. However, a disposition height of the partition plate 4 may be determined equally in view of both of the operability as the weighing chamber 7 and prevention of generation of convection. The disposition height may be appropriately determined so as to improve the operability of the weighing chamber 7 by uplifting the disposition height of the partition plate 4, or so as to mainly aim to reduce convection in the weighing chamber 7 by lowering the height in contrast.

Next, reference numerals 9a and 9b are suspended walls drooped by the supporting members 8, and are supported by the supporting members 8a and 8b to be disposed so as to be adjacent to the doors 10a and 10b in the upper part of the weighing chamber 7, and to be positioned in the opening and closing directions of the doors 10a and 10b. In addition, these suspended walls 9a and 9b are supported by the supporting members 8a and 8b, thereby providing these suspended walls 9a and 9b with a function as beams supporting the partition plate 4.

Further, given that the widths in a vertical direction of the suspended walls 9a and 9b are set to be narrow, for example, in the case where the partition plate 4 is disposed at a relatively low position, and set to be wide as shown by reference numerals 9a' and 9b' in the case where the position of the partition plate 4 is high, it is possible to satisfy both of operability of the weighing chamber 7 and suppression of convection.

FIG. 2 schematically shows air flow in the weighing chamber 7 in the case where the door 10a of the weighing chamber of the above-described configuration is opened. In the case where warm air rises up from the floor surface of the weighing chamber in the weighing chamber 7, the capacity of the weighing chamber 7 is reduced with the partition plate 4, thereby making its temperature distribution approximately uniform in a relatively short time in the weighing chamber 7, which suppresses air convection. In the case where the door 10a is opened in this state, when there is a temperature difference between the inside and outside of the weighing chamber 7, the warm air flows out to the outside from the upper part of the weighing chamber 7. Meanwhile, a large portion of the air layer of warm air stagnant under the partition plate 4 does not flow out by the suspended wall 9a. Accordingly, large air flow (convection) is not generated inside the weighing chamber 7 even when the door 10a is opened, and even if flow is generated to a certain extent, the capacity of the internal space of the weighing chamber 7 is limited by the partition plate 4, and therefore, the flow is settled down in a short time.

Next, a concrete example of a method for utilization of the upper space 6 will be shown.

The configuration of FIG. 1 shows an example in which the space 6 is utilized as a neutralization chamber.

A plurality of discharge needles (denoted by reference numerals 11A and 11B when illustrated) are disposed as direct-current type ion generation means in a rear wall 6A of the neutralization chamber. For example, the space 6 is set as a space for neutralization with the discharge needle 11A being (+) and the discharge needle 11B being (−). In addition, although not illustrated, a neutralizer for applying high voltage for generating ions to these discharge needles is disposed in the mechanism chamber 3.

Next, a usage state of the electronic balance having the above-described neutralization chamber 6 will be described.

First, in advance of measurement of a sample, humidity is sensed, and it is determined corresponding to the sensed humidity whether neutralization is required or not. With respect to this humidity, a method in which a humidity sensor is disposed in the vicinity of the weighing chamber 7, and humidity sensed by this humidity sensor is displayed on, for example, a display panel P is favorable. Although various types of display methods may be conceived of, there are methods that, for example, in the case where humidity is 40% or less, which has a high necessity for neutralization, the numbers for humidity are displayed in red, and in the case where humidity is from 40% to 80%, which is recommended to perform neutralization just in case, the numbers for humidity are displayed in yellow, and in the case where humidity is 80% or more, which does not require neutralization, the numbers for humidity are displayed in blue, and the like.

In the above configuration, in the case where it is judged that neutralization of a sample is required, the door 10a or 10b is opened, and a sample is first disposed in the upper space 6 serving as a neutralization chamber. In this case, there is a possibility that the warm air in the weighing chamber 7 positioned under the upper space 6 flows out to the outside. However, the outflow of warm air is stopped by a small amount by the suspended wall 9a, and even when air convection is generated in the weighing chamber 7, it is not built in intensity, and settles down in a short time. The door 10a is again opened to place the sample subjected to neutralization on the weighing dish 2 of the lower weighing chamber 7, and its weight is measured. In this case as well, because of the presence of the suspended wall 9a, even when convection is generated in the weighing chamber 7, it is small in scale, and settles down in a short time.

In the electronic scale having the neutralization chamber as the above-described configuration, the number of opening and closing of the door is increased as described above. Therefore, there is a possibility that the effect due to generation of convection in the weighing chamber may be a great error factor at the time of measuring a weight more than an electronic scale, which has no neutralization function. However, by forming the suspended walls 9a and 9b, it is possible to suppress generation of convection as low as possible as compared with the number of opening and closing of the door.

Next, the partition plate 4 is formed of a high thermally-conductive material, and heat of the warm air generated in the weighing chamber 7 is transferred to the inside of the upper space 6 via the partition plate 4, to form a stagnant layer of warm air in the space 6. In this way, given that the device is configured to make a warm air layer stagnant in the space 6, it is possible to substantially uniform a temperature distribution in the lower weighing chamber 7 for a given length of time until the warm air layer in the space 6 is saturated, and it is possible to suppress the outflow of air from the weighing chamber at the time of opening and closing of the door to an extremely slight amount. As a result, it is possible to suppress generation of convection in the weighing chamber 7 as low as possible as well. In addition, it is possible to form a stagnant layer of warm air in the upper space 6 by opening many micropores in the partition plate 4.

The above configurations are both configured to open and close the lower weighing chamber 7 and the upper space 6 by the same doors 10*a* and 10*b*. On the other hand, although the structure is complicated to a certain extent, given that doors are separately formed to the upper space 6 and the lower weighing chamber 7 respectively, there is no need to open and close the other space unnecessarily at the time of opening and closing one of the spaces. Therefore, it is possible to more effectively prevent generation of convection in the weighing chamber 7 in combination with the installation of the suspended walls.

INDUSTRIAL APPLICABILITY

Given that the device is configured to be able to change the installation positions of the members supporting the partition plate in the vertical direction, in accordance with the resolution of the electronic scale, for example, in a high-performance electronic scale, a main object may be to prevent generation of convection by reducing the capacity of the space of the weighing chamber by lowering the installation height of the partition plate. In contrast, in a device whose minimum scale value is relatively large, because the effect by convection is relatively small, it is possible to provide a configuration in which it is also possible to appropriately select to set an installation height of the partition wall such as heightening the installation height of the partition wall so as to give priority to ease of use.

BRIEF DESCRIPTION OF THE DRAWINGS

FIG. 3 is a conceptual diagram showing a state of air flow in a conventional weighing chamber.

DESCRIPTION OF SYMBOLS

Figure 1:
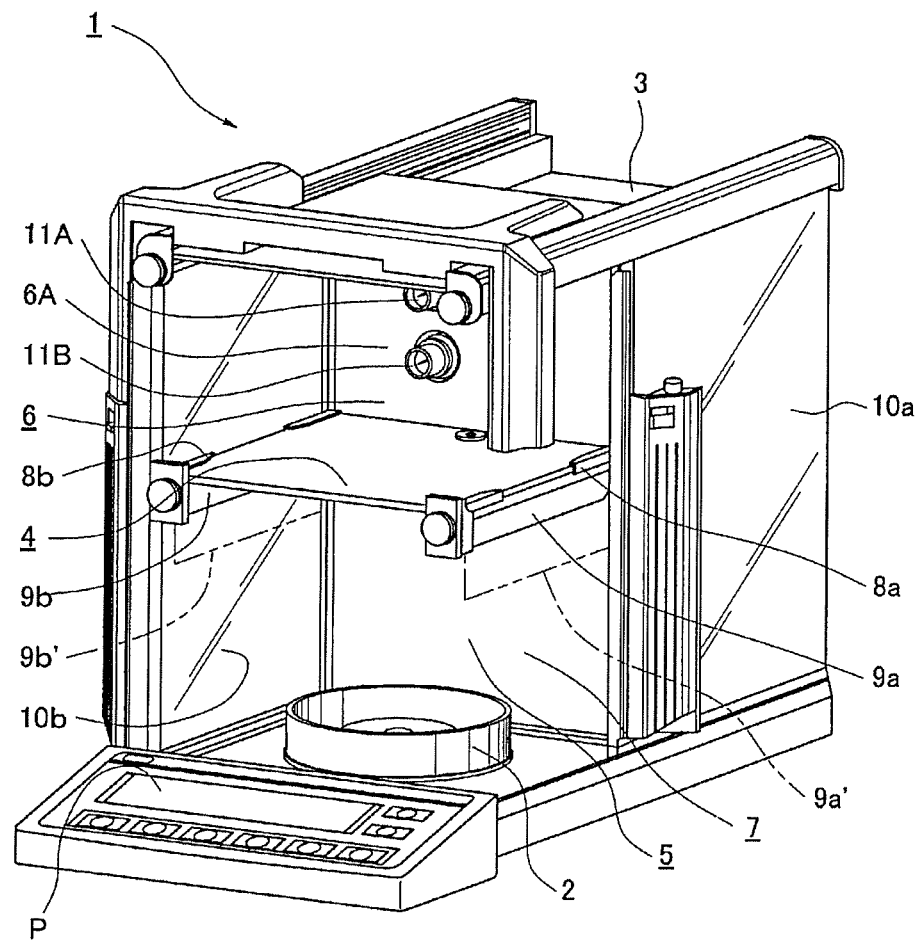
FIG. 1 is a partially broken perspective view of an electronic scale according to the present invention, which has a configuration in which an upper space is formed as a neutralization chamber.
Figure 2:
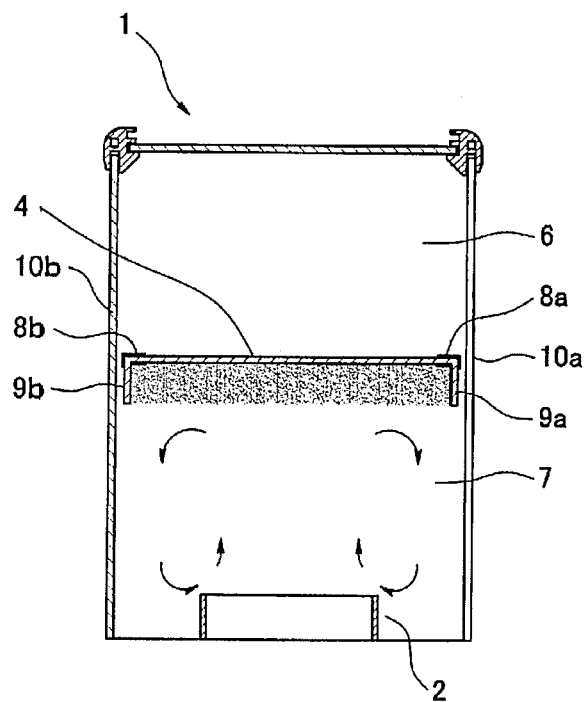
FIG. 2 is a conceptual diagram showing a state of air flow in a weighing chamber of the electronic scale shown in FIG. 1.
Figure 3A:
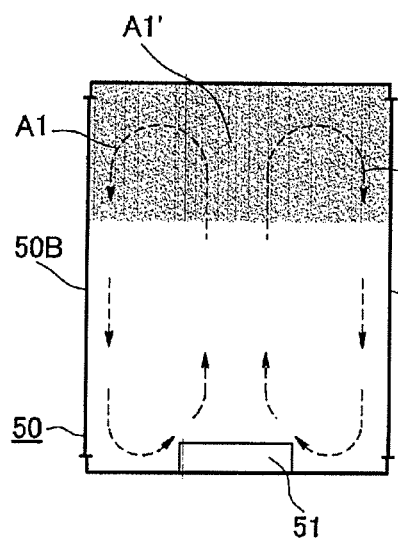
FIG. 3A is a diagram showing a state of air flow in a sate in which a door is closed.
Figure 3B:
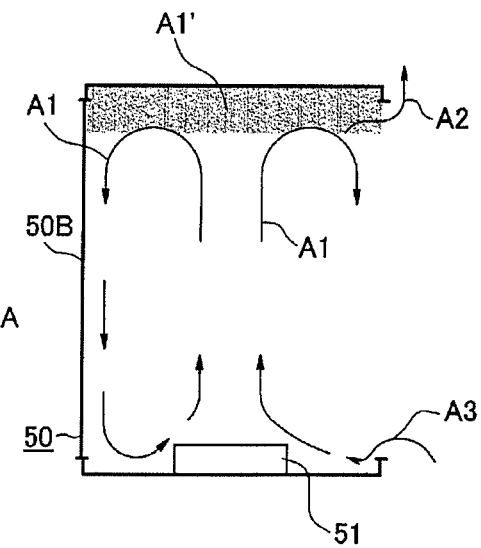
FIG. 3B is a diagram showing a state of air flow when the door is opened.

1: Electronic scale
2: Weighing dish
3: Mechanism chamber
4: Partition plate
5: Weighing space
6: Upper space (neutralization chamber)
7: Weighing chamber
8*a*, 8*b*: Supporting member
9*a*, 9*b*: Suspended wall
10*a*, 10*b*: (Sliding) door
11*a*, 11*b*: Discharge needle

The invention claimed is:

1. An electronic scale comprising
a weighing space, which is openable and closable, in which a weighing dish is internally disposed, the electronic scale having a weighing chamber wherein the entire weighing space is configured as a weighing chamber, and
a pair of suspended walls which are at an upper part of the weighing chamber, both of which are adjacent to a door of the weighing chamber, and have given widths vertically, are disposed along opening and closing directions of the adjacent door,
wherein the weighing space is partitioned into upper and lower spaces with a partition plate, the lower space is configured as a weighing chamber, and the suspended walls are fixedly hung on the lower space side along side edges of the partition plate.

2. The electronic scale having the weighing chamber according to claim 1, wherein the upper space formed by the partition plate is configured as a neutralization chamber.

3. The electronic scale having the weighing chamber according to claim 1, wherein the upper space formed by the partition plate is configured as a stagnant space of warm air.

4. The electronic scale having the weighing chamber according to claim 1, wherein two doors are separately provided on different sides of the weighing space to each of the upper space and the lower weighing chamber formed by the partition plate.

\* \* \* \* \*